US006478226B2

(12) United States Patent
Canini et al.

(10) Patent No.: US 6,478,226 B2
(45) Date of Patent: Nov. 12, 2002

(54) CODED INFORMATION READER COMPRISING A DEVICE FOR CONTROLLING A PLURALITY OF DISTINCT ACTIONS

(75) Inventors: Federico Canini, Zolo Predosa (IT); Marco Storto, Campobasso (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/785,537

(22) Filed: Feb. 20, 2001

(65) Prior Publication Data

US 2002/0056755 A1 May 16, 2002

(30) Foreign Application Priority Data

Nov. 10, 2000 (EP) .............................. 00830745

(51) Int. Cl.⁷ .................................. G06K 7/10
(52) U.S. Cl. ........................ 235/462.48; 235/462.23; 235/454
(58) Field of Search ................. 235/462.48, 462.23, 235/454

(56) References Cited

U.S. PATENT DOCUMENTS

| | | | |
|---|---|---|---|
| 5,589,680 A | | 12/1996 | Swartz et al. |
| 5,640,001 A | * | 6/1997 | Danielson et al. ...... 235/462.23 |
| 5,684,287 A | * | 11/1997 | Walts .......................... 235/454 |
| 5,712,471 A | * | 1/1998 | Bremer ................... 235/462.48 |
| 5,844,593 A | * | 12/1998 | Proffitt et al. ................ 347/262 |
| 5,996,896 A | | 12/1999 | Grabon |

FOREIGN PATENT DOCUMENTS

JP        40213707 A    *  5/1990

* cited by examiner

*Primary Examiner*—Thien M. Le
*Assistant Examiner*—Allyson Sanders
(74) *Attorney, Agent, or Firm*—Nixon & Vanderhye, P.C.

(57) ABSTRACT

A coded information reader (101) including a device (1) for controlling a plurality of distinct actions, as well as a method for controlling said coded information reader (101) are described. The coded information reader (101) includes a control device (1) comprising a plurality of actuators (2, 3) arranged in sequence downstream of a driving device (4) mobile between an inactive position (A) and a plurality of positions (B, C) active, respectively, on the status of said plurality of actuators (2, 3), said actuators (2, 3) being driven by said driving device (4). Advantageously, the coded information reader (101) of the invention has small size, reliability and flexibility of use.

20 Claims, 2 Drawing Sheets

CODED INFORMATION READER COMPRISING A DEVICE FOR CONTROLLING A PLURALITY OF DISTINCT ACTIONS

BACKGROUND

1. Field of the Invention

The present invention relates to a coded information reader comprising a device for controlling a plurality of distinct actions, and to a method for controlling a coded information reader of said type.

2. Related Art and Other Considerations

In the following description and in the subsequent claims, the expression "coded information reader" is used to indicate any device capable of acquiring information relating to an object (for example distance, volume, size, or its identification data) through the acquisition and processing of a luminous signal diffused by the same object.

In the following description and in the subsequent claims, the expression "coded information" is used to indicate all identification data contained in an optical code.

In the following description and in the subsequent claims, the expression "optical code" is used to indicate any graphic representation having the function of storing a coded information.

An example of optical code comprises linear or bidimensional codes, wherein the information is coded through suitable combinations of elements having predetermined shape, such as for example squares, rectangles or hexagons, dark-colored (usually black), separated by light elements (spaces, usually white) such as bar codes, stacked codes, and bidimensional codes in general, color codes, etc. Further examples of "optical codes" comprise graphic shapes with the function of information coding, including light printed characters (letters, numbers, etc.) and particular patterns, such as for example stamps, logos, signatures, fingerprints, etc.

Graphical representations detectable outside the field of visible light can also be regarded as "optical codes", for example in the wavelength range comprised between infrared and ultraviolet.

Known coded information readers essentially comprise:

- a luminous source for generating a luminous beam which is projected on the coded information to be read, for example through slits and lenses, in general referred to with the expression "illumination optics";
- optical elements adapted to collect and focus the light diffused by the coded information, for example slits and lenses, in general referred to with the expression "reception optics";
- photosensitive elements on which the light collected by the reception optics is focused, adapted to detect the light diffused by the coded information and convert it into an electrical signal, which reproduces as accurately as possible the reflectance modulations of the elements forming the coded information; as well as
- processing means for interpreting or decoding the coded information for obtaining the significant information incorporated therein, such as for example the manufacturer's name, the name of the specific product, the production batch, the price, etc.

The luminous source may comprise LEDs or lasers, whereas the photosensitive elements may comprise a single photodiode, a linear or matrix CCD (Charge Coupled Device) or C-MOS (Complementary Metal Oxide Silicon). Finally, coded information may be read by means of fixed or hand-held readers.

One of the fundamental problems of coded information readers is that their continuous improvement has made them more and more sophisticated, i.e. they are provided with a higher and higher number of functions and controls upon which their operation is based. As the number of functions executable by such readers increases, the user interface complexity also increases. In this sense the term "interface" is used to indicate all control devices provided to the user for activating the different functions of the reader.

In particular, in order to make such readers capable of carrying out a plurality of functions, there is the need of performing a plurality of distinct actions. Such actions include, for example, the optical code aiming action and the optical code scanning action, the latter involving the acquisition of the coded information to be read and the decoding of the same.

According to the prior art, the control of two distinct actions is carried out by means of a double-action mechanical control switch. The switch is provided with a driving lever which can be positioned in three positions. One of the positions of the lever is inactive and two positions are active. Each active position of the lever corresponds to the opening or closing of a respective electrical contact provided in the circuit for actuating the two distinct actions. Switches of said type are commercially available with the SKQA and SKHF codes (Alps Electric Co Ltd).

If used in the field of coded information readers, such switches are particularly cumbersome, which is a limit to the miniaturization of the readers. Moreover, double-action switches have proven not to be sufficiently robust to ensure a reasonable lifetime. Last but not least, these components are difficult to find on the market.

A further teaching of the prior art for controlling two distinct actions is the use of two single-action mechanical control switches.

The single-action control switches, which can be actuated by the user by means of one or more mechanical levers, have proven to be more robust than the above double-action switches. Nevertheless, although they consist of easily found components, the single action control switches require a complex design from the mechanical point of view. Moreover, the flexibility of use is limited, since the user does not have the possibility of directly passing to the second action while bypassing to carry out the first action. This last disadvantage is evident, for example, when a skilled user—for whom the aiming action may be superfluous—want to pass directly to the image scanning action so as to quicken the reading step.

SUMMARY

The present invention provides a coded information reader and a method for controlling a coded information reader, which facilitates both robustness and reliability of the control device, and a control of the device size in view of its application in small-sized readers, while ensuring flexibility of use of the reader by the user.

According to a first aspect of the invention, a coded information reader comprises a device for controlling a plurality of distinct actions, including a plurality of actuators arranged in sequence downstream of a driving device mobile between an inactive position and a plurality of positions active, respectively, on the status of said plurality of actuators. The actuators are driven by the driving device, and at least one actuator is of a physical-control type.

In the following description and in the subsequent claims, the expression "mechanical control actuator" is used to indicate any actuator activated by an activating means of the mechanical type which operates by displacing one or more mechanical gears, such as push-buttons, levers, cursors, compensators, etc. The expression "physical control actuator", on the other hand, is used to indicate any actuator with no mechanical activating means. Physical control actuators may be activated, for example, by light, by an electromagnetic field, by pressure, by temperature, by an acoustic signal, etc.

The expression "distinct actions" is used to indicate both permanent actions, which continue in time also when the action of the actuator ends (such as for example, the switching on of a luminous source, a typical operation of the switch), and temporary actions, which only last for the duration of the actuator action.

Advantageously, thanks to the presence of at least one physical control actuator, the coded information reader of the invention has a flexibility wherein the user can bypass one or more specific actions and thus pass directly to the desired action by simply positioning the driving device to the position active on the status of the actuator which generates the desired action.

Moreover, physical control actuators are intrinsically more robust and reliable with respect to mechanical control actuators, thus advantageously contributing to impart robustness and reliability to the coded information reader of the invention.

According to a further embodiment of the invention, the last actuator of the sequence of said actuators can be a mechanical control actuator.

Advantageously, in addition to generating a specific action which is distinct with respect to those generated by the remaining actuators, a mechanical control actuator arranged in the last position of the sequence of actuators provided in the control device (being part of the coded information reader of the invention) also acts as a mechanical end of stroke for the driving device.

According to a further embodiment, the driving device comprises a lever mobile between said inactive position and said plurality of active positions.

Preferably, the driving device is selected from the group comprising: integrated photo-actuators, pairs including non-integrated photo-emitter and photo-receiver, magnetic sensors, Hall effect sensors, proximity sensors, pressure sensors, temperature sensors and acoustic sensors.

Preferably, the physical control actuator is selected from the group comprising: integrated photo-actuators, pairs including non-integrated photo-emitter and photo-receiver, magnetic sensors, Hall effect sensors, proximity sensors, pressure sensors, temperature sensors and acoustic sensors.

According to a preferred embodiment, the device of the invention further comprises control logic which provides at least one signal associated with the status of the physical control actuator.

Thanks to the control logic providing the signal associated with the status of the physical control actuator, the physical control actuator can be cyclically switched off. This allows a reduction of energy consumption connected to the power supply of the device of the invention.

Preferably, the control logic is connected to the physical control actuator and to a storing means, still more preferably to a condenser arranged downstream of the physical control actuator. The charge of the storing means is associated (at fixed times) with the status of the physical control actuator.

It is possible to periodically sample the tension at the ends of the condenser, thus obtaining from the control logic a signal depending on the status of the physical control actuator. As a consequence, the physical control actuator can be maintained switched off for predetermined time ranges, with a consequent advantageous energy saving.

According to a further embodiment, the coded information reader comprises an acoustic and/or visual warning device for warning of the status of the above-mentioned actuators.

Advantageously, the presence of the acoustic and/or visual warning device enables the user to know the status of the actuators.

In a second aspect thereof, the coded information reader executes a plurality of distinct actions by means of a plurality of actuators arranged in sequence. The activation of said actuators occurs by means of a driving device mobile between an inactive position and a plurality of positions active, respectively, on the status of said actuators. At least one of the actuators is a physical control actuator.

Preferably, the last actuator of the sequence of said actuators is a mechanical control actuator.

Preferably, the method of the invention further comprises the steps of:

subjecting said physical control actuator alternatively to a switching on cycle and to a switching off cycle;

generating a signal indicative of the status of said physical control actuator independently of the cycle to which said physical control actuator is subjected.

Advantageously, said expedient facilitates reduction of the energy required for the power supply of the physical control actuator, thus obtaining an energy saving which is particularly desired in the case of battery-powered readers.

Advantageously, thanks to the generation of said signal, the control of a plurality of distinct actions also is ensured during the switching off cycle of the physical control actuator.

In a third aspect thereof, a device which controls a plurality of distinct actions comprises a plurality of actuators arranged in sequence downstream of a driving device mobile between an inactive position and a plurality of positions active, respectively, depending on the status of said plurality of actuators. The actuators are driven by said driving device, and at least one of said actuators is of the physical control type.

Advantageously, thanks to the presence of at least one physical control actuator, the device for controlling a plurality of distinct actions of the invention has a flexibility wherein the user can bypass one or more specific actions and pass directly to the desired action by simply positioning the driving device to the position active on the status of the actuator which generates the desired action.

BRIEF DESCRIPTION OF THE DRAWINGS

Further features and advantages of the present invention will appear more clearly from the description of some embodiments of a method for controlling a coded information reader comprising a device for controlling a plurality of distinct actions according to the invention, made hereinbelow with reference to the attached drawings wherein, for illustrative and non-limiting purposes, a control device for carrying out said method is represented.

In the drawings.

DETAILED DESCRIPTION

Figure 1:
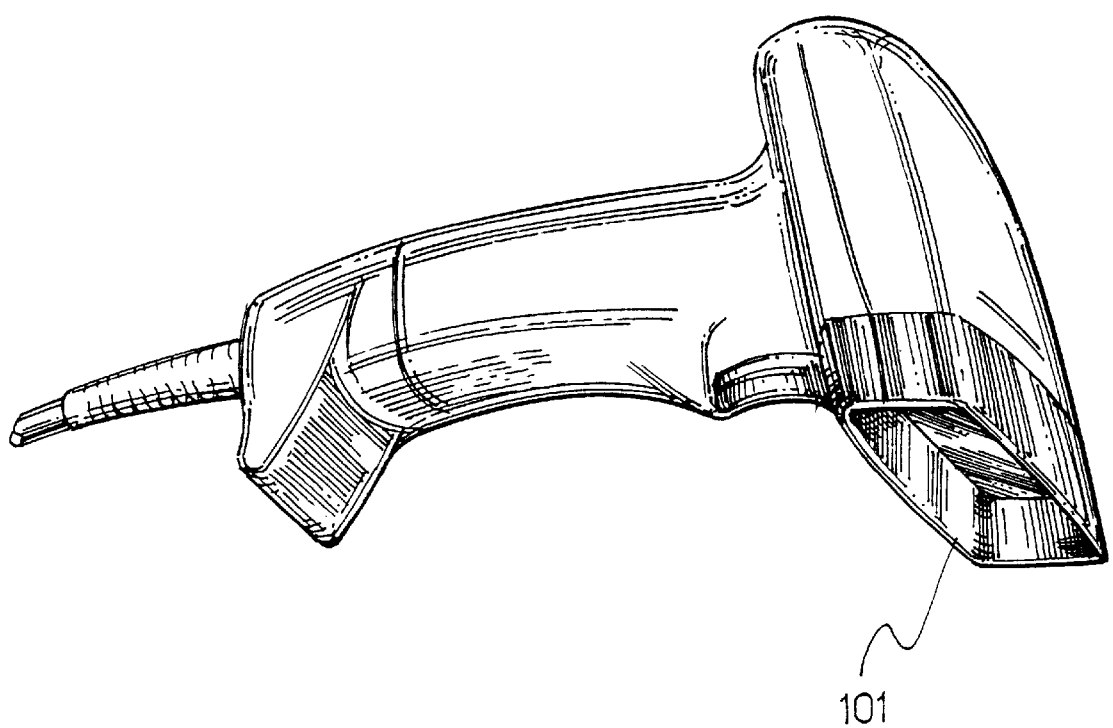
FIG. 1 is a schematic view of a coded information reader according to the invention.
Figure 2:
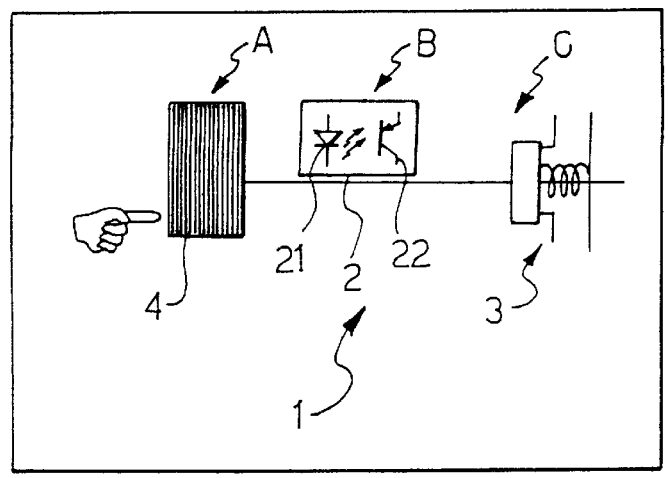
FIG. 2 is a schematic view of a device for controlling two distinct actions, said device being part of a first embodiment of the coded information reader of FIG. 1.

FIG. 2 schematically shows a control device 1 which is part of a first embodiment of a coded information reader 101, the reader 101 being shown in FIG. 1. The control device 1 is adapted to control a pair of distinct actions, such as for example the aiming action and the action of acquiring the coded information to be read.

The control device 1 comprises a physical control actuator. In the illustrated example the physical control actuator takes the form of a photo-actuator 2, known per se, which is capable of generating a first action, such as (for example) the action of aiming the coded information.

The control device 1 also comprises, downstream of the photo-actuator 2, a mechanical control actuator. In the illustrated example an electromechanical push-button 3 of conventional type serves as the mechanical control actuator. The electromechanical push-button 3 is adapted to generate a second action, for example the action of acquiring the coded information.

Moreover, the control device 1 of the coded information reader 101 of the invention comprises a driving device, such as for example a driving lever 4 of mechanical type. The driving lever 4, shown schematically in FIG. 2, is mobile, e.g., moveable, between a first inactive position (indicated at A in FIG. 2), a second position (indicated at B) active on the status of the photo-actuator 2, and a third position (indicated at C) active on the status of the electromechanical push-button 3.

The photo-actuator 2 is essentially constituted by a photodiode 21 and a phototransistor 22, known per se.

With reference to the device 1 described above, in a first embodiment thereof, the method for controlling a coded information reader 101 according to the invention including the above-mentioned device 1 comprises the step of activating the actuators 2 and 3 by means of the driving lever 4.

In particular, when the user wants to carry out in sequence both the action of aiming and acquiring the coded information, in a first moment the photo-actuator 2 is activated by means of the driving lever 4. That is, in the first moment the driving lever 4 is shifted to the second position B, which causes the light emitted by the photodiode 21 to be reflected onto the phototransistor 22. The activation of the photo-actuator 2 thus enables performance of the first action, i.e. (in the illustrated example) aiming the coded information to be read.

In a second moment, the driving lever 4 is shifted to the third position C At the second moment, the driving lever activates the electromechanical push-button 3 and thereby generates the second action, i.e. the scanning of the coded information to be read.

Advantageously, in addition to generating the second action of scanning the coded information to be read, the electromechanical push-button 3 also acts as mechanical end of stroke of the lever 4.

Since the photo-actuator 2 does not interfere with the stroke of the driving lever 4, it is advantageously possible to bypass the aiming action at position B and to pass directly to the action of acquiring the image by simply moving the driving lever 4 from the inactive position A to the position C (active on the status of the mechanical control actuator 3).

The photo-actuator 2 can be continuously fed so as to be available in any moment for driving the action associated to it. However, continuous feeding of the photo-actuator 2 involves a certain electric energy consumption, which may be undesirable in applications using battery-powered hand-held readers.

Figure 4:
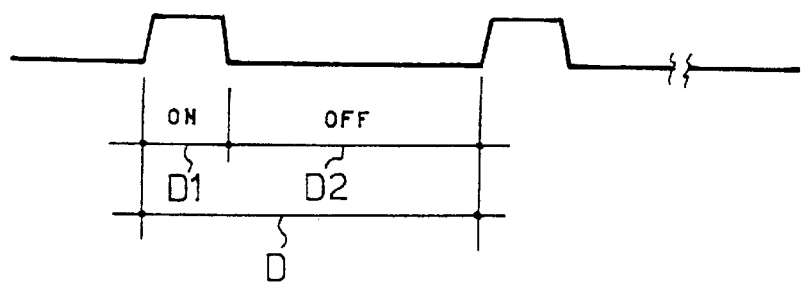
FIG. 4 is a diagram illustrating a preferred embodiment of the control method of the invention.

It is thus preferable to feed the photo-actuator 2 according to a cycle D (schematically shown in FIG. 4). The cycle D comprises an activation step D1, wherein the photo-actuator is operating, and a switching off step D2, wherein the photo-actuator is not operating. The duration of the cycle D is selected to be sufficiently short so that the user does not perceive the existence of any discontinuity of operation of the coded information reader 101. For example, in order to obtain a theoretical reduction of consumption equal to 98%, the duration of the step D1 may be 100 $\mu$s, whereas the duration of the step D2 may be 4.9 ms, resulting in a cycle D having a total duration of 5 ms (which is much less than human perception capacity). Theoretically, the reduction of consumption shall be equal to 98% (equal to the percentage of the switching off time), but actually a little less, due to the consumption introduced by the components used to carry out this function.

Figure 3:
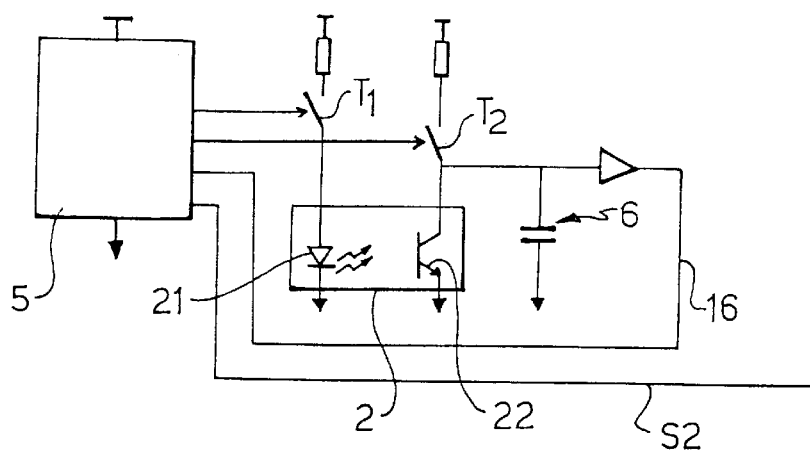
FIG. 3 shows a circuit for controlling a physical control actuator illustrated in FIG. 2.

FIG. 3 shows a circuit scheme which facilitates the above-mentioned function for controlling the energy consumption. For this purpose, the control device 1 further comprises control logic or control unit 5, constituted for example by a PIC16C505 microcontroller (produced by MICROCHIP), which is a reliable and low-consumption component, with a low price.

The photo-actuator 2 is connected to the control logic 5 in the way shown in FIG. 3. An actuator T1 controls the switching on of the photodiode 21 and an actuator T2 brings a storage means such as condenser 6 (e.g., capacitor) to a known status. The actuators T1 and T2 are of the solid state type (BJT or MOS type transistors) and are driven by the control logic 5. Moreover, the condenser 6 is connected in parallel to phototransistor 22 and thus fed by means of the actuator T2. Additionally, a feedback line 16 connects the condenser 6 to the control logic 5.

The operation of the circuit of FIG. 3 is described below with reference to FIG. 4 and FIG. 5.

At the beginning of the cycle D, a sub-step, in which T1 is open and T2 is closed, is provided. Thus, in this beginning sub-step, the condenser 6 is charged, whereas the photodiode 21 does not emit any light.

Afterwards, another sub-step, in which T1 is closed and T2 is open, is provided. In this sub-step, the photodiode 21 emits light, therefore the device is capable of having different behaviors according to the position of the lever 4, i.e. the actuator 2 is active. In particular, if the position of the lever 4 reflects the light of the photodiode 21 onto the phototransistor 22, the condenser 6 can discharge through the same phototransistor 22. Otherwise, the condenser 6 remains charged.

Finally, a step D2, in which both T1 and T2 are open, is provided. In this step, the condenser 6 tends to discharge spontaneously, with a certain slowness.

Figure 5:
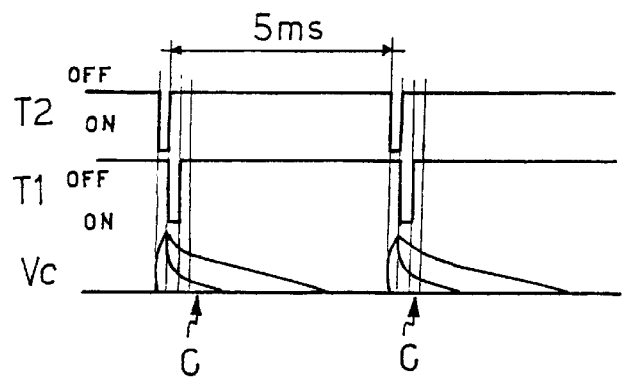
FIG. 5 is a diagram illustrating the operation of the device of FIG. 3 according to the method of FIG. 4.

The state of charge of the condenser 6 is shown in FIG. 5. It can be noted that the state of the condenser 6 in a not too advanced moment of the step D2 is representative of the position of the driving lever 4. Thus, the control logic 5 provides for the sampling of the tension at the ends of the condenser 6 in a sampling instant C immediately following the start of the step D2, and correspondingly provides a stable trigger signal S2 (see FIG. 3) The signal S2 is a signal of "actuator 2 open" if the tension detected on the condenser 6 is higher than a predetermined threshold. Otherwise, the signal S2 is a signal of "actuator 2 closed".

It must be noted that the actuator 2 absorbs electrical power during the step D1, whereas the actuator 2 does not absorb electrical power during the switching off step D2. Thus, the complete cycle is D=D1+D2.

For simplicity of exposition, a device 1 with a single non-electromechanical actuator 2 was used as an example in the above description. The same considerations apply to the case of a plurality of said actuators. In the case of plural actuators, just one control logic for all actuators can be advantageously provided.

It is also evident that the device 1 may comprise a plurality of physical control actuators, if the mechanical control actuator is missing.

Moreover, the device 1 or the coded information reader 101 may comprise a beeper and/or LEDs which can provide the user with acoustic and/or visual warnings of the activation status of the various actuators.

All advantages obtained by the invention and particularly those relating to the possibility of realizing a small-sized control device, reliable and such as to impart to the coded information reader 101 flexibility of use also suitable for more expert users are immediately evident from what described and illustrated above.

What is claimed is:

1. An optical code reader comprising:
    a driving device;
    a plurality of actuators arranged in a sequence downstream of the driving device;
    the driving device being movable between an inactive position and a plurality of positions active, respectively, on a status of the plurality of actuators;
    the actuators being driven by the driving device; and
    at least one of the actuators being of a physical control type.

2. An optical code reader according to claim 1, wherein a last of the plural actuators in the sequence is a mechanical control actuator.

3. An optical code reader according to claim 1, wherein the driving device comprises a lever movable between said inactive position and the plurality of active positions.

4. An optical code reader according to claim 1, wherein said driving device comprises one of the following: an integrated photo-actuator, a non-integrated photo-emitter and a non-integrated photo-receiver, a magnetic sensor, a Hall effect sensor, a proximity sensor, a pressure sensor, a temperature sensor, and an acoustic sensor.

5. An optical code reader according to claim 1, wherein the at least one of the physical control type actuators comprises one of the following: an integrated photo-actuator, a non-integrated photo-emitter and a non-integrated photo-receiver, a magnetic sensor, a Hall effect sensor, a proximity sensor, a pressure sensor, a temperature sensor, and an acoustic sensor.

6. An optical code reader according to claim 1, further comprising a control unit for generating at least one signal indicative of the status of the physical control type actuator.

7. An optical code reader according to claim 6, wherein said control unit is connected to at least one of said physical control type actuators and to at least one storing means.

8. An optical code reader according to claim 7, wherein said storing means is a condenser.

9. An optical code reader according to claim 1, further comprising an acoustic and/or visual warning device for warning of the status of at least one of said plural actuators.

10. A method for controlling a optical code reader which executes a plurality of distinct actions by means of a plurality of actuators arranged in a sequence, the method comprising activating the actuators by means of a driving device which moves between an inactive position and a plurality of positions status of the actuators, one of the actuators being a physical control actuator.

11. The method according to claim 10, wherein a last actuator of the sequence is a mechanical control actuator.

12. The method according to claim 10, further comprising the steps of:
    subjecting said physical control actuator alternatively to a switching on cycle and to a switching off cycle;
    generating a signal associated with a status of the physical control actuator independently of the cycle to which the physical control actuator is subjected.

13. The method according to claim 12, wherein a ratio between a duration of the switching on cycle and the duration of the switching off cycle is between 1/100 and 1/25.

14. A coded information reader comprising:
    a selector device movable through plural positions corresponding to plural actions performable by the reader;
    plural actuators arranged in a sequence, the plural actuators being situated at corresponding positions of said plural positions and being selectively activated by the selector device to actuate corresponding ones of the plural actions;
    one of the plural actuators being at an intermediate position in the sequence and being of a type whose corresponding action can be bypassed by moving the selector device to another position in the sequence.

15. The apparatus of claim 14, wherein the one of the plural actuators whose corresponding action can be bypassed is a physical control actuator.

16. The apparatus of claim 15, wherein the physical control actuator is a photo-actuator.

17. The apparatus of claim 14, wherein the plural actions include aiming at coded information and acquiring the coded information, and wherein the action which can be bypassed is aiming at the coded information.

18. The apparatus of claim 14, further comprising:
    a storage device for storing a charge;
    a control unit for the one of the plural actuators at the intermediate position, the control unit driving the one of the plural actuators at the intermediate position using a switched duty cycle and sampling the charge at the storage device at a predetermined point in the duty cycle to determine whether the selector device has moved to the intermediate position to actuate the one of the plural actions which corresponds to the intermediate position.

19. A coded information reader comprising:
    a selector device movable through plural positions corresponding to plural actions performable by the reader;
    plural actuators arranged in a sequence, the plural actuators being situated at corresponding positions of said plural positions and being selectively activated by the selector device to actuate corresponding ones of the plural actions;
    one of the plural actuators being a photo-actuator situated at an intermediate position in the sequence, the photo-actuator including a photo-emitter and a photo-receiver, light from the photo-emitter being reflected to the photo-receiver when the selector device is at the intermediate position;

a storage device for storing an electrical charge;

a control unit for the photo-actuator, the control unit driving the photo-actuator using a switched duty cycle and sampling the charge at the storage device at a predetermined point in the duty cycle to determine whether the selector device has moved to the intermediate position to cause light emitted from the photo-emitter to be reflected to the photo-receiver.

20. The apparatus of claim 19, wherein the plural actions include aiming at coded information and acquiring the coded information, and wherein the action of aiming at the coded information is associated with the photo-actuator.

* * * * *